United States Patent Office 3,331,398
Patented July 18, 1967

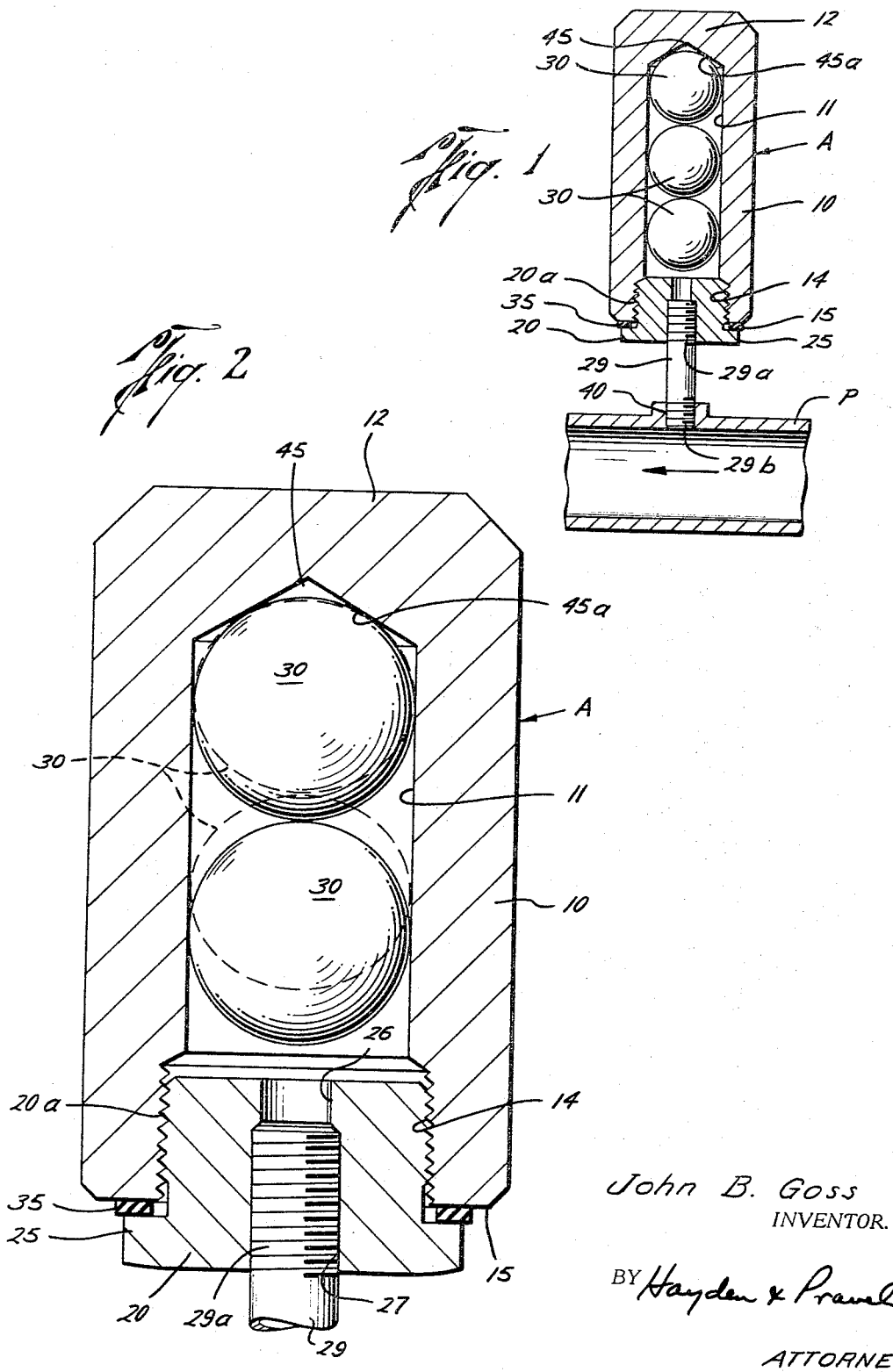

3,331,398
PULSATION DAMPENER
John B. Goss, 2606 Knoblock St.,
Houston, Tex. 77026
Filed Nov. 27, 1964, Ser. No. 414,330
2 Claims. (Cl. 138—26)

This invention relates to new and useful improvements in pulsation dampeners.

An object of the present invention is to provide a new and improved pulsation dampener for dampening pulsations occurring in a fluid flowing in a pipe.

An important object of this invention is to provide a new and improved pulsation dampener which is inexpensive to manufacture and is relatively simple in its construction, whereby the initial cost as well as repair and replacement costs are low.

Another object of this invention is to provide a new and improved pulsation dampener having a chamber with one or more elastic balls disposed therein and with such balls being exposed to pulsations in fluid flowing in a pipe connected to the chamber so that such balls serve as yieldable elastic pistons to reduce pulsations of the fluid flowing in the pipe and any equipment which may be connected thereto.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a view, partly in section and partly in elevation, illustrating one form of the pulsation dampener of this invention in position for use on a pipe having a fluid flowing therein; and FIG. 2 is a view, partly in elevation and partly in section, illustrating a modified form of the pulsation dampener of this invention.

In the drawings, the letter A designates generally the pulsation dampener of this invention. Briefly, the pulsation dampener A is adapted to be mounted for use in conjunction with a pipe P or any other fluid conductor through which fluid such as water, oil or the like is flowing. As will be more fully explained, the pulsation dampener A is adapted to remove or reduce pulsations in the fluid flowing in the pipe or other conductor P.

The pulsation dampener A is preferably formed with a cylindrical housing 10 having a relatively thick wall surrounding an inner cylindrical bore 11. One end 12 of the housing 10 is closed while the other end is threaded as indicated at 14 for receiving a closure plug 20. Such closure plug 20 has threads 20a thereon for coacting threaded engagement with the internal threads 14 on the housing 10. When the plug 20 is removed from the housing 10, the bore 11 is opened fully for receiving one or more elastic balls 30. The closure plug 20 has a lower flange 25 formed thereon which is adapted to clamp a seal ring 35 into sealing contact with the lower end 15 of the housing 10 to provide a seal for the closure plug 20. Such seal ring 35 is preferably formed of rubber, neoprene or other known types of elastic sealing materials.

The closure plug 20 is provided with an inlet opening 26 which is threaded at 27 for receiving a heavy duty threaded nipple 29 having external threads 29a thereon which are in threaded engagement with the threads 27. Such threaded nipple 29 also has lower threads 29b thereon which are in threaded engagement with threads 40 provided in a tapped hole in the pipe P.

It is to be noted that in FIG. 1, three of the elastic balls 30 are shown within the cylindrical bore 11. The FIG. 2 form of the invention is identical with that of FIG. 1, but it is only provided with two of the elastic balls 30. In some instances, the balls 30 may be increased or decreased and for that reason FIGS. 1 and 2 are shown with numbers of such balls 30. It is, however, preferable to have at least two of such balls 30 since they function together in reducing pulsations in the fluid flowing in the pipe P, as will be more evident hereinafter.

Each of the balls 30 is preferably formed of a rubber which is compressible by the force of the pulsations acting thereon when the fluid from the pipe P is admitted through the nipple 29 the cylindrical bore or chamber 11. If water is the fluid flowing in the pipe P, the balls 30 may be formed of natural latex or rubber and may be of the hardness comparable to a typical handball. Each of the balls 30 is preferably formed as a solid member and in the preferred form of the invention the rubber or other material forming each ball 30 will extend throughout the structure of the ball 30. If the fluid flowing in the pipe P is oil, it is preferable to form each of the balls 30 from a synthetic rubber such as neoprene which will be substantially unaffected by the oil.

It will be appreciated that other materials may be used for forming the balls 30 providing they are sufficiently soft to be compressible when the fluid pulsations are transmitted thereto from the pipe P. Also, such material must be elastic so as to tend to return to the original shape between the fluid pulsations so that there is a counter force provided to offset the pulsations and provide for a smoothing of the flow of the fluid in the pipe P.

In this connection, it should be noted that the upper end of the bore 30 is provided with a recess 45 formed by the conical wall 45a at the upper end of the cylindrical bore 11. As best seen in FIG. 2, each of the balls 30 has a diameter which is approximately equal to the diameter of the cylindrical bore 11 so as to snugly fit within such bore 11. Also, the vertical diameter of each of the balls 30 is in alignment with the longitudinal central axis of the cylindrical bore 11. The recess 45 at the upper end of the cylindrical bore 11 is provided to support the ball 30 at such upper end of the bore 11 while also providing space to permit a compression of the ball 30 and a distortion thereof when the pulsations from the fluid in the pipe P are transmitted to the balls 30. Such distortion in the shape of the balls 30 is illustrated by the dotted line forms of the balls 30 in FIG. 2. It can also be seen that by providing the pair or more of balls as illustrated in the drawings, the balls 30 cooperate with each other in providing a resistance to the pulsations and also a counteracting force to such pulsations to tend to smooth the flow of the fluid flowing in the pipe P.

Although the magnitude of the pulsations which may occur in the fluid flowing in the pipe P may vary, it has been found that satisfactory pulsation dampeners A having the construction illustrated in the drawings may be provided for pressures as high as 6,000 pounds per square inch.

In the use of the pulsation dampener of this invention, it is positioned as illustrated in FIG. 1, or it is connected to the pipe P in any other suitable manner so that the fluid in the pipe P communicates with the bore or chamber 11. The pulsations from the liquid which might otherwise result in violent shaking of the equipment and a water hammer effect are avoided or reduced to a satisfactory level. The balls 30 actually function as elastic pistons when the surges or pulses of the fluid act thereon since the balls 30 fit snugly within the bore or chamber 11. Since each of the balls 30 is elastic, it returns to its original uncompressed shape when the pressure pulsations are relieved therefrom. Because of the relatively few working parts of the present invention and the rugged construction of each of such parts, the pulsation dampener A of this invention is economical to manufacture and repair. Should it become necessary to replace any or all of the balls 30, they may be readily replaced by simply unthreading the housing 10 from the closure plug 20 to provide access to the bore 11.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A pulsation dampener adapted to be used for dampening pulsations of fluid flowing in a pipe, comprising:
   (a) a housing having a cylindrical bore which is closed at one end,
   (b) closure means closing the other end of the bore,
   (c) a plurality of elastic balls disposed with a diameter of each in longitudinal alignment with the central longitudinal axis of the cylindrical bore,
   (d) means in said closure means for introducing pulsating fluid into the cylindrical bore for compressing the balls to provide a force in opposition to the pulses to thereby reduce the pulsations, and
   (e) each of said balls having a diameter approximately equal to the diameter of the cylindrical bore to provide a snug fit therewith whereby such balls act against the adjacent balls and remain in longitudinal alignment with the central longitudinal axis of the cylindrical bore while compressing the adjacent ball and while acting as elastic pistons when subjected to the pulsating flow of the fluid.

2. A pulsation dampener adapted to be used for dampening pulsations of fluid flowing in a pipe, comprising:
   (a) a housing having a cylindrical bore which is closed at one end,
   (b) closure means closing the other end of the bore,
   (c) a plurality of elastic balls disposed with a diameter of each in longitudinal alignment with the central longitudinal axis of the cylindrical bore,
   (d) means in said closure means for introducing pulsating fluid into the cylindrical bore for compressing the balls to provide a force in opposition to the pulses to thereby reduce the pulsations,
   (e) each of said balls having a diameter approximately equal to the diameter of the cylindrical bore to provide a snug fit therewith whereby such balls act against the adjacent balls and remain in longitudinal alignment with the central longitudinal axis of the cylindrical bore while compressing the adjacent ball and while acting as elastic pistons when subjected to the pulsating flow of the fluid, and
   (f) each of said balls being formed of solid elastic material capable of being compressed upon the application of pulsations thereto and also capable of elastically moving back towards its normal uncompressed shape between pulsations to thereby counteract the pulsating flow and provide a smoother flow of the fluid.

References Cited

UNITED STATES PATENTS

| | | | |
|---|---|---|---|
| 651,617 | 6/1900 | Tilden | 138—26 X |
| 2,497,020 | 2/1950 | Singer | 138—26 |

FOREIGN PATENTS

| | | |
|---|---|---|
| 1,202,627 | 7/1959 | France. |
| 845,582 | 6/1952 | Germany. |

LAVERNE D. GEIGER, *Primary Examiner.*

T. L. MOORHEAD, *Assistant Examiner.*